(12) United States Patent
Lee et al.

(10) Patent No.: US 6,611,914 B1
(45) Date of Patent: Aug. 26, 2003

(54) SECURITY CARD CHECK TYPE COMPUTER SECURITY SYSTEM METHOD

(75) Inventors: Jang-won Lee, Seoul (KR); Yong-seok Shin, Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/263,809

(22) Filed: Mar. 8, 1999

(30) Foreign Application Priority Data

Mar. 6, 1998 (KR) .......................................... 1998-7509

(51) Int. Cl.[7] .......................... G06F 11/30; G06F 9/00; G06F 1/26; G06F 15/173; G06F 15/16
(52) U.S. Cl. .............................. 713/200; 713/1; 713/2; 713/201; 713/202; 713/300; 713/340; 709/223; 709/224; 709/229
(58) Field of Search ................................. 713/200, 201, 713/202, 172, 159, 185, 182, 1, 2, 300, 320, 340, 223, 224, 229; 709/223, 224, 229

(56) References Cited

U.S. PATENT DOCUMENTS

| 5,742,756 A | 4/1998 | Dillaway et al. | |
|---|---|---|---|
| 5,781,723 A | 7/1998 | Yee et al. | |
| 5,836,010 A | 11/1998 | Kim | |
| 5,854,891 A | 12/1998 | Postlewaite et al. | |
| 5,968,142 A | * 10/1999 | Frederic | 710/1 |
| 6,032,256 A | * 2/2000 | Bernard | 713/200 |
| 6,260,111 B1 | * 7/2001 | Craig et al. | 235/380 |

FOREIGN PATENT DOCUMENTS

| JP | 64-55692 | 3/1989 |
|---|---|---|
| JP | 8-161446 | 6/1996 |

* cited by examiner

Primary Examiner—Gail Hayes
Assistant Examiner—Jenise Jackson
(74) Attorney, Agent, or Firm—Robert E. Bushnell, Esq.

(57) ABSTRACT

In a security card check type computer security method, it is determined whether a predetermined check condition for checking a right of a security card to use a computer, which stores at least security information enabling the identification of the right of use of computer, is satisfied and a combination key requiring checking is generated. When the combination key is received, check result data with respect to the security card is waited for. The security information of the security card is checked to obtain the check result data. The right of use of computer is controlled depending on the check result data.

23 Claims, 11 Drawing Sheets

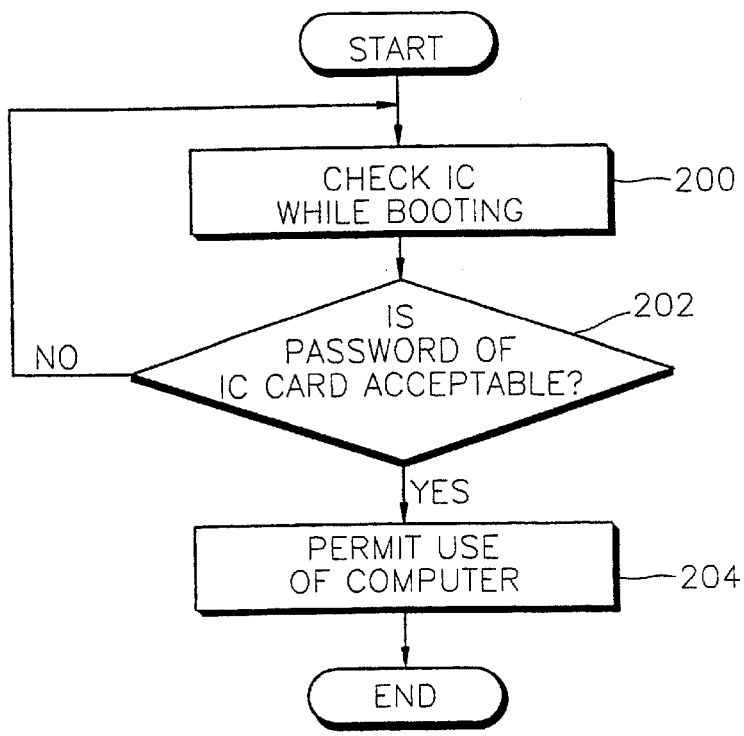
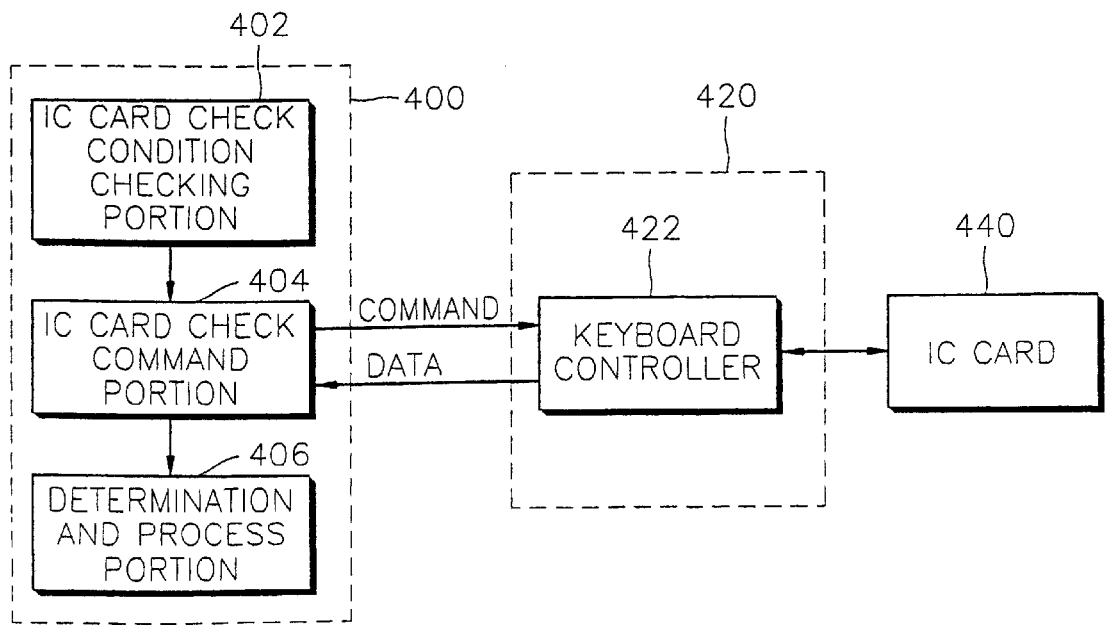

SECURITY CARD CHECK TYPE COMPUTER SECURITY SYSTEM METHOD

CLAIM OF PRIORITY

This application makes reference to, incorporates the same herein, and claims all benefits accruing under 35 U.S.C. §119 from an application for Security Card Check Type Computer Security System And Method earlier filed in the Korean Industrial Property Office on Mar. 6, 1998 and there duly assigned Ser. No. 7507/1998.

FIELD OF THE INVENTION

The present invention relates to a security function of a computer, and more particularly, to a security card check type computer security system which guarantees safety of the computer by checking a security card inserted by a user and restricting the use of the computer, and a method therefor.

DESCRIPTION OF THE RELATED ART

In general, a security function of a computer is to restrict an access to a computer or data stored in the computer to only authorized users. The security function is achieved by identifying a password of a user or searching the level of right to use of a user using a security program. As the importance on security has been increasingly emphasized, a more complete computer security program is needed. Particularly, a computer security apparatus using an IC card is needed.

SUMMARY OF THE INVENTION

To solve the above problems, it is an objective of the present invention to provide a security card check type computer security system which checks an IC card by a keyboard while using a computer as well as a booting process of the computer according to a check command generated and transmitted by the computer to the keyboard so that cost is reduced and an effect on computer security increases.

It is another objective of the present invention to provide a security card check type computer security method performed by the above computer security system generating a check command.

It is still another objective of the present invention to provide a security card check type computer security system which checks an IC card by a keyboard using a combination key without generating a check command by the computer to the keyboard so that a load to the computer due to the generation of the check command can be lowered and an effect on computer security increases.

It is yet another objective of the present invention to provide a security card check type computer security method performed by the above computer security system using a combination key.

Accordingly, to achieve the first objective, there is provided a security card check type computer security system which comprises: a security card at least storing a password for identifying a right of use of computer, the security card being inserted into a slot provided at one side of the keyboard; a computer which generates a check command to check the security card, when a predetermined check condition for checking the right for using the computer of the security card is satisfied, and controls the right of use of computer depending on the received check result data with respect to the security card; and a keyboard which checks security information of the security card in response to the security card check command and transmits the check result data of the security card to the computer.

To achieve the second objective, there is provided a security card check type computer security method which comprises the steps of: (a) determining whether a predetermined check condition for checking a right of a security card to use a computer, which stores at least security information enabling the identification of the right of use of computer, is satisfied; (b) generating a check command to check the security card when the predetermined check condition is satisfied; (c) checking the security information of the security card according to the check command and obtaining check result data; and (d) controlling the right of use of computer depending on the check result data.

To achieve the third objective, there is provided a security card check type computer security system which comprises: a security card at least storing a password for identifying a right of use of computer, the security card being inserted into a slot provided at one side of the keyboard; a keyboard which checks security information of the security card when a predetermined key is input and generates check result data of the security card; and a computer which prepares to receive the check result data of the security card from the keyboard when the predetermined key is input and controls a right to use the computer depending on the received check result data of the security card.

To achieve the fourth objective, there is provided a security card check type computer security method which comprises the steps of: (a) determining whether a predetermined check condition for checking a right of a security card to use a computer, which stores at least security information enabling the identification of the right of use of computer, is satisfied and a combination key requiring checking is generated; (b) waiting for check result data with respect to the security card when the combination key is received; (c) checking the security information of the security card and obtaining the check result data; and (d) controlling the right of use of computer depending on the check result data.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 2 is a flow chart for explaining the operation of an earlier security system using an IC card;

FIG. 4 is a block diagram showing a computer security system according to a preferred embodiment of the present invention;

DETAILED DESCRIPTION OF THE INVENTION

Figure 1:
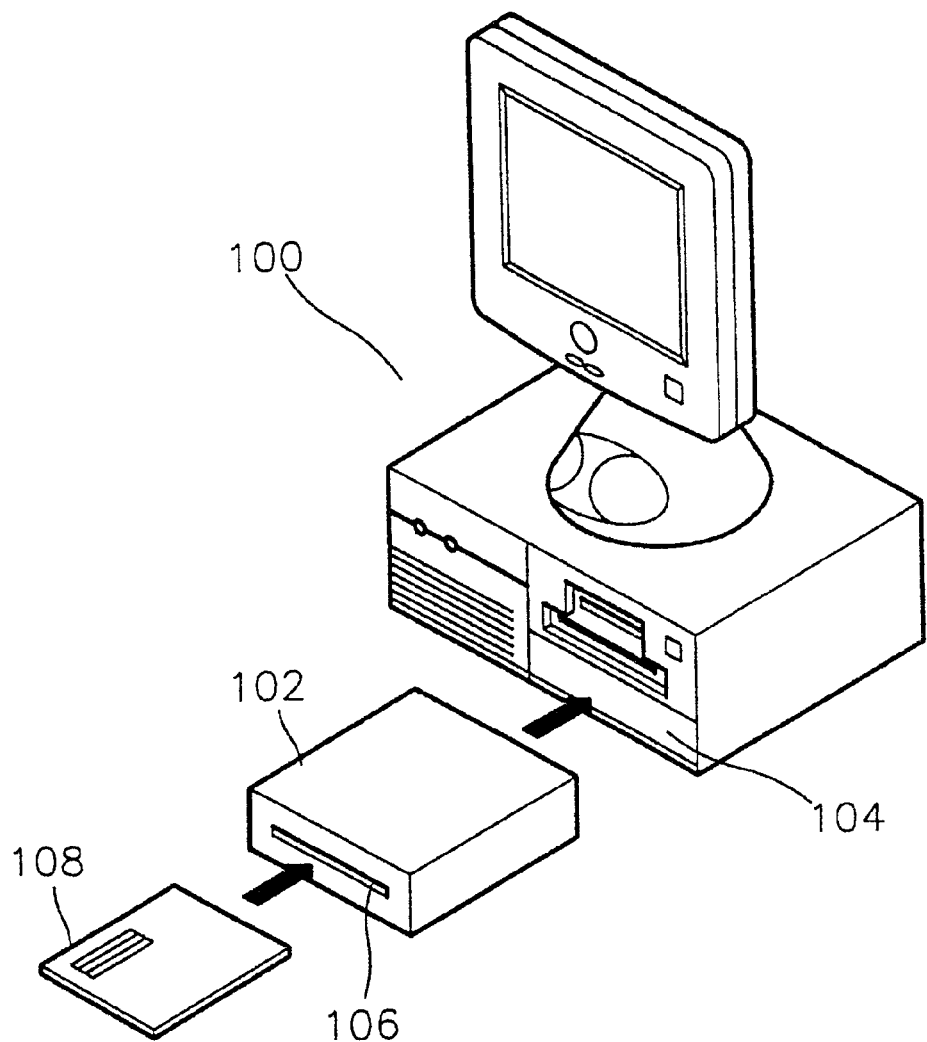
FIG. 1 is a view illustrating the appearance of an earlier computer security system using an IC card.

FIG. 1 is a view showing the appearance of an earlier computer security system using an IC card. Here, reference numerals 100 and 102 represent a computer and an IC card drive, respectively. Referring to FIG. 1, the IC card drive 102 is installed in an extension bay 104 provided at the front portion of the computer 100 as a floppy disk drive or a CD-ROM drive is installed in the computer 100. When using the computer 100, a user should insert a corresponding IC card 108 into an inlet 106 of the IC card drive 102. The IC card drive 102 checks the inserted IC card 108 during a booting process of the computer 100. The computer 100 restricts a use of the computer 100 according to the check result data. In this connection, the IC card drive 102 can be referred to as an access controller or an IC card security apparatus which controls an access to a computer.

FIG. 2 is a flow chart for explaining the operation of an earlier computer security system using an IC card.

Referring to FIG. 2, an IC card is checked while a computer is booted (step 200). Next, a password stored in the IC card is determined whether it matches a predetermined password (step 202). If it is determined to be coincident in step 202, an access to the computer by a user is permitted (step 204). If it is not determined to be coincident in step 202, the system returns to step 200, not permitting an access to the computer, and waits for an insertion of a corresponding IC card.

As shown in the above, in an earlier computer security system using an IC card, since the IC card drive 102 inserted in the extension bay 104 of the computer 100 is additionally needed, cost for hardware increases. Also, since the IC card 108 inserted in the IC card drive 102 is checked only one time during a booting process of a computer, an effect on computer security is reduced.

Figure 3:
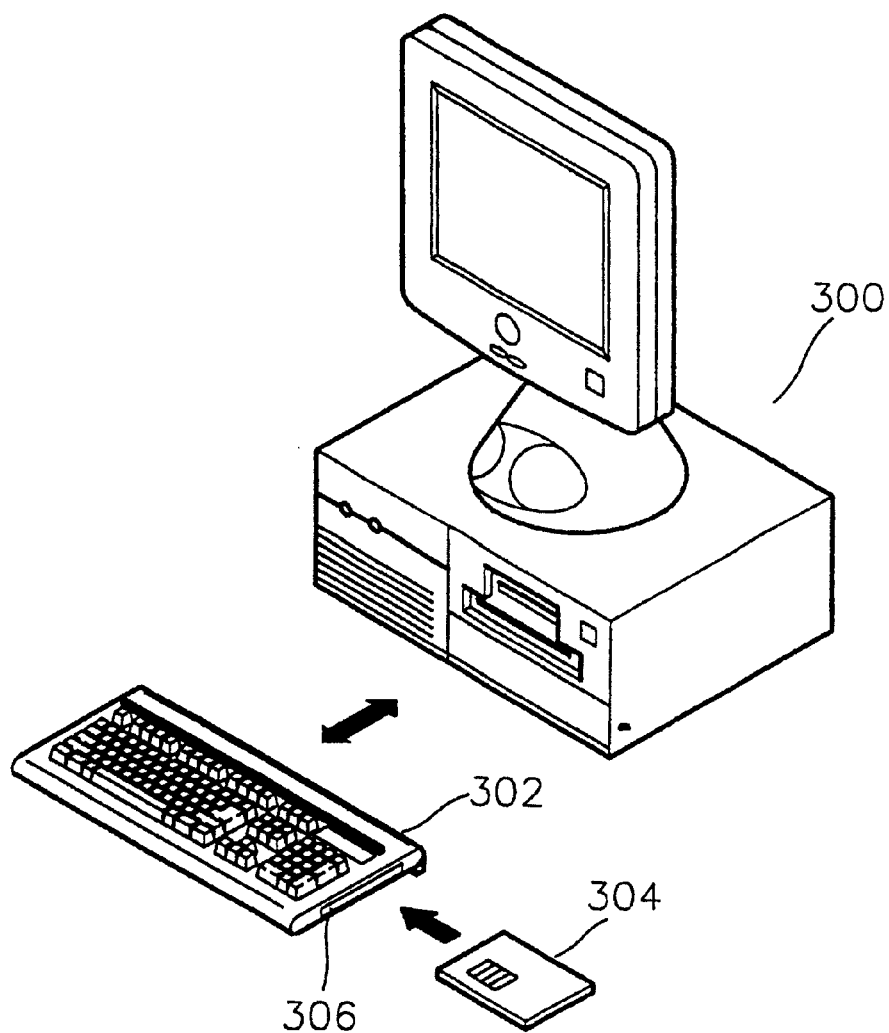
FIG. 3 is a view illustrating the appearance of a computer security system according to the present invention.

In FIG. 3, reference numerals 300, 302 and 304 represent a computer, a keyboard, and a security card such as an IC card, respectively.

The keyboard 302 has an inlet 306 for inserting the IC card 304 at one side, e.g., the right side thereof, as shown in FIG. 3, and an extension slot (not shown) for plugging in the IC card through the inlet 306. When a user wants to use the computer 300, a corresponding IC card 304 should be inserted in the inlet 306 of the keyboard 302. Here, the IC card 304 must store an password [as] a security information for identifying a right of use of the computer 300. The keyboard 302 basically checks the IC card 304 inserted while the computer is booted and transmits the check result data to the computer 300. The computer 300 controls a right of use of the computer according to the check result data.

The computer security system according to the present invention checks the IC card 304 not only in the initial booting stage of the computer 300 but also after the computer is booted by exchanging data between the computer 300 and the keyboard 302 according to predetermined check conditions and controls a right of use of the computer depending on the check result data.

FIG. 4 shows the configuration of a computer security system according to a preferred embodiment of the present invention. The computer security system comprises a computer 400, a keyboard 420, and an IC card 440. The computer 400 includes an IC card check condition checking portion 402, an IC card check command portion 404, and a determination and process portion 406, which can be embodied by an application for computer security or hardware. The keyboard 420 includes a keyboard controller 422.

Referring to FIG. 4, the computer 400 generates and transmits a check command to the keyboard 420, when predetermined check conditions with respect to the IC card 440 are satisfied. Then, the computer 400 controls a right of use depending on the received check data from the keyboard 420 in response to the check command. That is, when the computer 400 checks the IC card 440, the computer generates and transmits a check command to check the IC card 440 to the keyboard 420. Here, the keyboard 420 checks a password of the IC card 440 in response to the check command from the computer 400 and transmits the check result data back to the computer 400.

The IC card check condition checking portion 402 checks first whether it is an initial booting state as a basic check condition with respect to the IC card 440. In another check condition, the IC card check condition checking portion 402 checks whether a predetermined wait time has passed in a state in which no input is made by a user to the computer through the keyboard 400 or a mouse (not shown). The computer 400 continuously monitors peripheral equipments such as the keyboard 420 or a mouse and determines whether there is an input by a user to the computer. At this time, the IC card check condition checking portion 402 checks a particular time with respect to a point when there is no input, i.e., the wait time has passed. Here, the wait time can be set by a user by using a program for setting the wait time.

Also, as yet another check condition for improving an effect on computer security, the IC check condition checking portion 402 checks whether the IC card 440 is detached from the slot of the keyboard 420. For that purpose, the keyboard 420 continuously checks the presence of the IC card 440. For example, when the IC card 440 is detached a predetermined check signal is transmitted from the keyboard 420 to the computer 400 so that the IC card check condition checking portion 402 can determine whether another check condition is satisfied. The IC card check condition checking portion 402 is not limited to the above-mentioned check conditions. For example, the IC card 440 can be checked at a predetermined interval without checking the wait time.

The IC card check command portion 404 generates and transmits a check command to the keyboard 420, when a condition of the predetermined check conditions checked by the IC card check condition checking portion 402 is satisfied, and receives the result data that the IC card 440 is checked from the keyboard 420.

Next, the determination and process portion 406 compares the checked result data received from the IC card check command portion 404 with reference data previously stored. If the checked result data is determined not to be proper, i.e., the password in IC card 440 fails to match a password stored in computer 400, the determination and process portion 406 does not permit a use of computer. The determination and process 406, for example, may deny an access to the computer by locking the screen of the computer and/or may also make the keyboard 420 or a mouse disabled so that a user cannot use an input device any more. As a method of locking the screen, a monitor disabling program such as a screen saver program can be used. Here, when the determination and process portion 406 does not permit a use of computer, a check command is generated again by the IC card check command portion 404 and the aforesaid actions repeat.

Referring to FIG. 4 again, the keyboard 420 includes a keyboard controller 422 which corresponds to a microprocessor or a logic circuit. The keyboard controller 422 checks the presence of the IC card 440 first and reads a password, through communication with the IC card 440 in response to the check command received from the IC card check command portion 404 of the computer 400. The result checked by the keyboard controller 422 is fed back to the computer 400 as the above-mentioned check result data. Also, the keyboard controller 422 continuously checks the presence of the IC card 440 and, when the IC card 440 is removed from keyboard 420, transmits a predetermined confirmation signal to the computer 400. The confirmation signal is a signal satisfying the check conditions that are checked by the IC card check condition checking portion 402.

Figure 5:
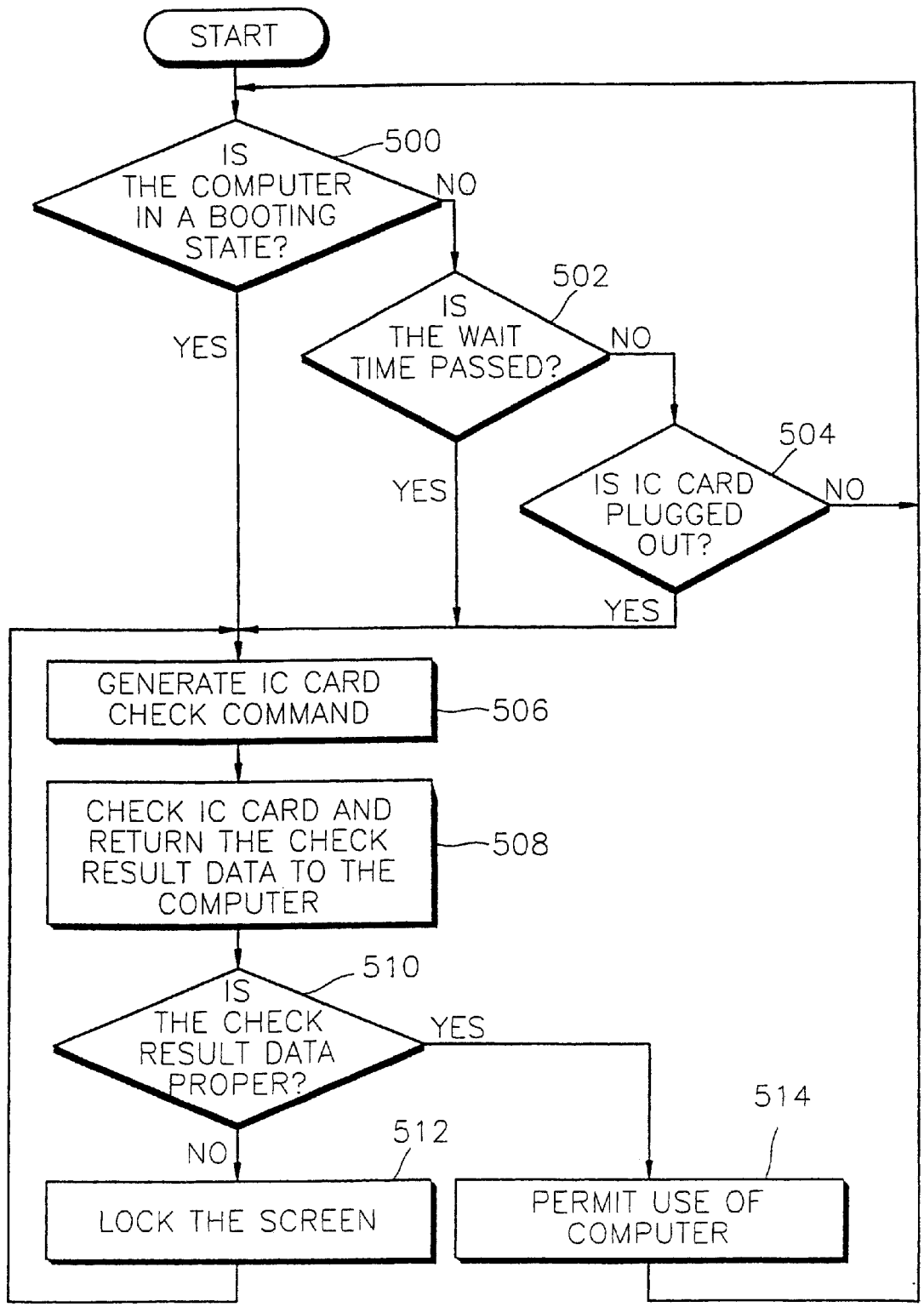
FIG. 5 is a flow chart for explaining a computer security method according to a preferred embodiment of the present invention.

FIG. 5 is a flow chart for explaining a computer security method according to a preferred embodiment of the present invention. According to the computer security method of the present invention, authorized use of a computer is controlled by checking the IC card storing at least a password for approving the right of use of a computer.

Referring to FIGS. 4 and 5, first, the computer 400 checks whether predetermined check conditions are satisfied with respect to the IC card 440. That is, it is determined whether the conditions to check the IC card 440 are satisfied for example, whether the computer 400 is in a initial booting state is basically determined as one of the check conditions (step 500). If the computer 400 is in the initial booting state, the computer 400 generates a check command with respect to the IC card 440 and transmits the command to the keyboard 420 (step 506). If the computer 400 is not determined to be in the initial boot state in step 500, it is determined whether a predetermined wait time has passed in a state in which there is no input by a user to the computer 400 after the initial booting state (step 502). If the wait time is passed by, the system proceeds with step 506. If the wait time is not passed by in step 502, it is determined whether the IC card inserted into the slot of the keyboard 420 is plugged out by the user or due to connection defectiveness while the computer 400 is in use (step 504). If the IC card 440 is plugged out, the system goes to step 506 and generates a check command with respect to the IC card 440. If the IC card 440 is not plugged out, the system returns to step 500 and the above steps are repeated.

In view of the foregoing, if at least one of the check conditions throughout from step 500 to step 504 is satisfied, the check command with respect to the IC card is generated in step 506. Then, the keyboard 420 checks the presence of the IC card 440 and a password according to the check command and returns the check result data to the computer 400 (step 508).

Then, the computer 400 controls a right of use of the computer by the user according to the check result data. In detail, after step 508, it is determined whether the check result data is proper (step 510). That is, whether the check result data is proper is determined by comparing the check result data with the previously stored reference data. If the check result data is determined to be proper in step 510, the computer permits the use of computer by the user (step 514). However, if the check result data is not proper, the screen of the computer is locked and the user of computer by the user is not allowed (step 512). Locking the screen means to disable the screen such that no information is displayed on the screen. Here, a message notifying such a status may be displayed for user's note. Alternatively, an input device such as the keyboard 400 or a mouse can be made disabled in an attempt to deny an access to the computer by the user. In order to release the locked screen, after step 512, the system returns to step 506 and repeats the steps until the check result data is determined to be proper.

As a result, according to the computer security system and method according to a preferred embodiment of the present invention, by altering a conventional keyboard to have a slot for inserting an IC card and using an application program for controlling the keyboard to check the IC card with various check conditions in addition to checking at the booting stage, cost is reduced compared with a conventional computer security apparatus and also an effect on computer security increases.

In the computer security system and method according to a preferred embodiment of the present invention, the computer 400 functions as a master and the keyboard 420 functions as a slave. That is, only when the check command is generated from the computer 400 to the keyboard 420, the keyboard controller 422 of the keyboard 420 checks the IC card 440. Then, the check result data is returned to the computer 400 to check whether it is proper.

Here, there are a few problems in generating the check command to check the IC card 440 from the computer 400 to the keyboard 420. Under the DOS circumstances, the check command can be easily generated from the computer 400 to the keyboard 420. However, under the Windows circumstances, it is difficult to generate the check command directly from an application program to a periphery device, i.e, the keyboard 420. Accordingly, a device driver that is a program informing a method of controlling and managing periphery devices to an operating system should be provided additionally. That is, under the Windows circumstances, since a device driver should be provided separately for the respective operating systems such as Windows 95 and Windows NT to give the check command directly from the computer 400 to the keyboard 420, which means a lack of ability of using the security feature by other operating systems than the one which it was designed for, it is inconvenient to develop a new device driver whenever a new operating system is introduced.

To improve the above problem, in a computer security system and method according to another preferred embodiment of the present invention, the keyboard checks the IC card without generating the check command from the computer to the keyboard so that the above inconvenience of providing an additional device driver for each operating system, i.e., the same security system can function properly in a plurality of operating systems is possible.

Figure 6:
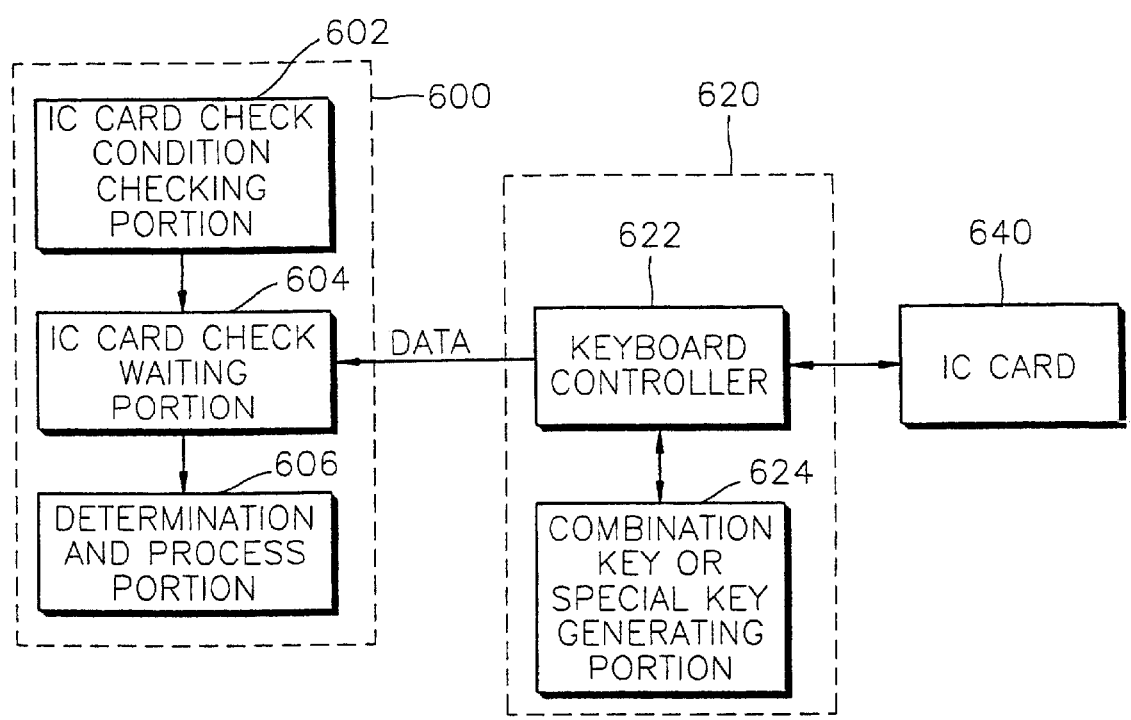
FIG. 6 is a block diagram showing a computer security system according to another preferred embodiment of the present invention.

FIG. 6 shows the configuration of a computer security system according to another preferred embodiment of the present invention. The computer security system includes a computer 600, a keyboard 620, and an IC card 640. The computer 600 comprises an IC card check condition checking portion 602, an IC card check waiting portion 604, and a determination and process portion 606, which can be embodied by an application for computer security or hardware. The keyboard 620 comprises a keyboard controller 622 and a combination key or special key generating portion 624.

Referring to FIG. 6, when predetermined check conditions with respect to the IC card 640 are satisfied, the computer 600 prepares to receive the check result data for the IC card 640 from the keyboard 620. According to the check result data received from the keyboard 620, a right of use of computer by the user is controlled. Here, the predetermined check conditions is for checking whether codes generated by a particular combination key, e.g., a combination key of Ctrl+Alt+general key, a special key, or a particular scan code (hereinafter, called a combination key) is input as an input to the computer 600. Then, the keyboard 620 checks the password of the IC card 640, in response to the combination key requesting a check of the IC card 640 generated internally or by an input of a user, and transmits the check result data back to the computer 600.

That is, both the computer 600 and the keyboard 620 always checks whether the combination key is input and, when the combination key is generated, the computer 600 waits for the check result data with respect to the IC card 640. Thus, the keyboard 620 can check the IC card 640 without receiving a check command from the computer 600. Consequently, the computer 600 and the keyboard 620 all operate as if a check command to check the IC card 640 is generated and transmitted from the computer 600 to the keyboard 620.

The IC card check condition checking portion 602 checks whether a combination key is generated from the keyboard 620 as the check condition. For instance, as in the preferred embodiment of the present invention described above, it is checked whether a combination key is generated according to the conditions that whether the computer 600 is in the initial booting state, a predetermined wait time passes in a state in which there is no input by a user to the computer 600, or the IC card 640 becomes detached from keyboard 620. Here, whether the computer 600 is in the initial booting state is checked automatically in a checking process of a keyboard during a booting process of the computer or by automatically generating a combination key bythe keyboard 620 while the computer is booted. Also, whether the predetermined wait time is passed is checked by pressing a button for the combination key by a user when the computer 600, which continuously monitors the keyboard or mouse, does not permit the use thereof after the wait time passes. Further, whether the IC card 640 is detached from keyboard 620 is checked by automatically generating the combination key when the IC card 640 becomes detached from the keyboard 620 which continuously checks the presence of the IC card 640.

The IC card check condition checking portion 602 is not limited to the above check conditions. For example, if necessary, a condition that the combination key requesting checking of the IC card 640 is generated at predetermined intervals regardless of pass of the wait time is possible.

The IC card check waiting portion 604 waits for the check result data to be transmitted from the keyboard 620, when the check conditions checked by the IC card check condition checking portion 602 are satisfied, determination portion 606 of computer 600 receives the check result data with respect to the IC card 640 from the keyboard 620.

Next, the determination and process portion 606 compares the check result data received from the IC card check waiting portion 604 with the previously stored reference data. If the check result data is determined to not be proper, i.e, the IC card 640 has an error, the determination and process portion 606 does not permit a use of computer. For example, the determination and process portion 606 can deny an access to the computer 600 by locking the screen of the computer or by making an input device such as the keyboard or mouse disabled except for entry of a hot keystroke. The method of locking the screen can be achieved by using a monitor turning-off program such as a screen saver program. Here, if the use of computer is not permitted by the determination and process portion 606, the IC card check waiting portion 604 prepares to receive a check command data again and repeats the above-mentioned actions.

Referring to FIG. 6 again, the keyboard 640 includes the keyboard controller 622 corresponding to a microprocessor or a logic circuit and the combination key or special key generating portion 624. The keyboard controller 622 checks the presence of the IC card 640, and reads the password, via communication with the IC card 640 in response to the generated combination key. The checked result by the keyboard controller 622 is transmitted to the computer 600 as the above-mentioned check result data. For that purpose, the combination key or special key generating portion 624 generates the combination key according to the key input by the user or automatically generates the combination key in response to a predetermined confirmation signal. Here, the confirmation signal may be a signal to inform the computer 600 that IC card 640 has become detached from keyboard 620 by continuously checking the presence of the IC card 640.

Figure 7:
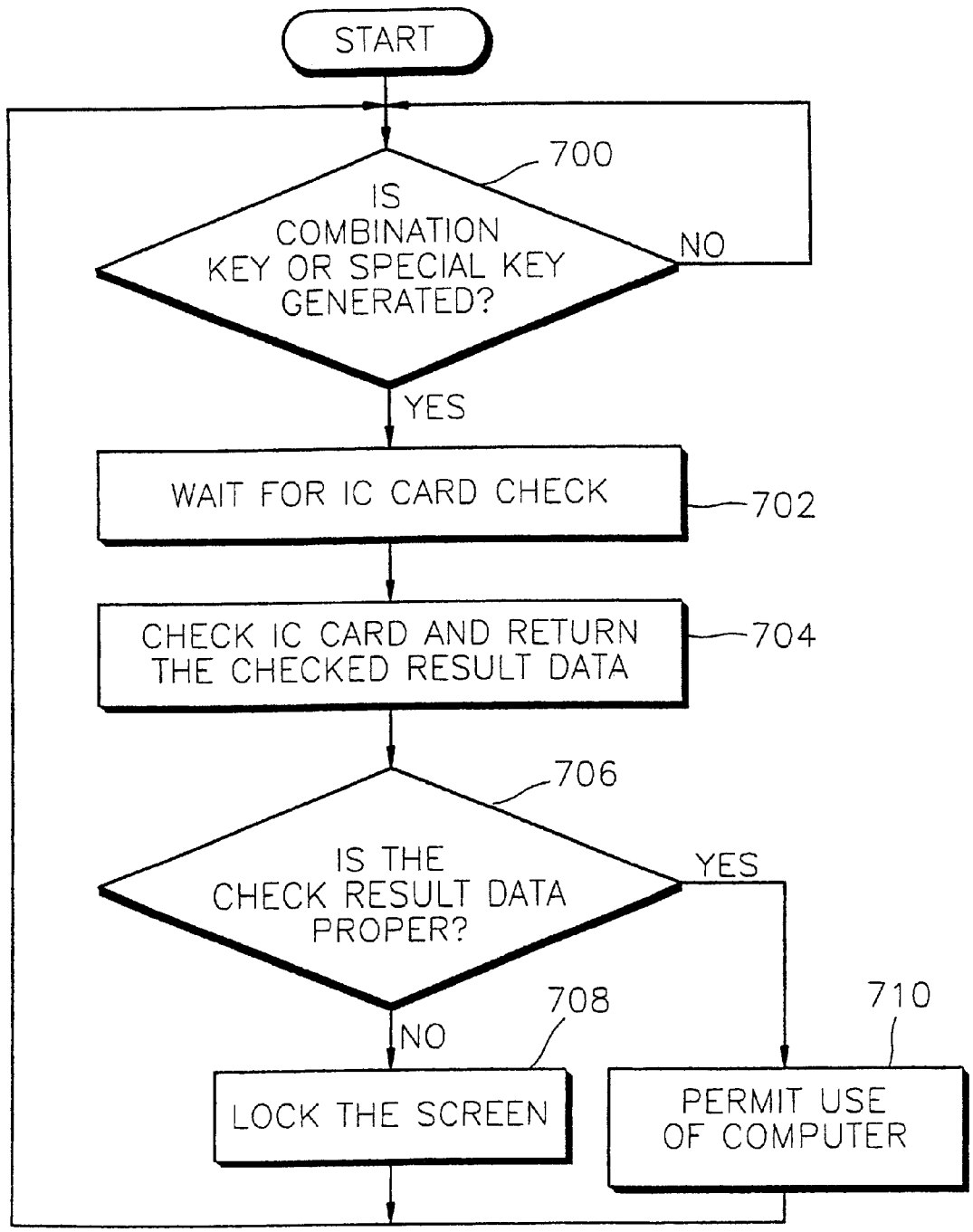
FIG. 7 is a flow chart for explaining a computer security method according to another preferred embodiment of the present invention.

FIG. 7 is a flow chart for explaining the computer security method according to another preferred embodiment of the present invention.

First, it is determined whether the predetermined check conditions with respect to the IC card 640 are satisfied and a combination key or special key is generated accordingly (step 700). The determination of step 700 is carried out by both the computer 600 and the keyboard 620. When the combination key or special key is determined to be generated in step 700, i.e., the combination key or special key is received to the computer 600, the check result data with respect to the IC card 640 is delayed in for (step 702). Otherwise, the generation of the combination key or special key is continuously determined. Here, when the combination key or special key is received by the keyboard 620, the IC card 640 is checked. After step 702, the computer 600 checks the password of the IC card 640 to obtain.the check result data (step 704).

According to the check result data, a right of use of the computer by a user is controlled. In detail, it is determined, after step 704, whether the check result data is proper (step 706). That is, the properness of the check result data is determined by comparing the check result data with the previously stored reference data. When the check result data is determined to be proper in step 706, the use of the computer by the user is permitted (step 710). If the check result data is not proper, the use of computer by the user is not permitted by locking the screen of the computer (step 708). Alternatively, the use of computer can be denied by making an input device such as a keyboard or mouse disabled except for entry of a hot keystroke. To release the locked screen after step 708, the system returns to step 700 and repeats the above steps until the check result data is determined to be proper. Also, after the use of computer is permitted in step 710, the system goes to step 700 and repeats actions for computer security.

In the computer security method according to another preferred embodiment of the present invention, various conditions for generating the combination key to improve an effect on computer security can be taken into account. Hereinafter, the condition for generating the combination key and locking and releasing the screen will be described.

Figure 8:
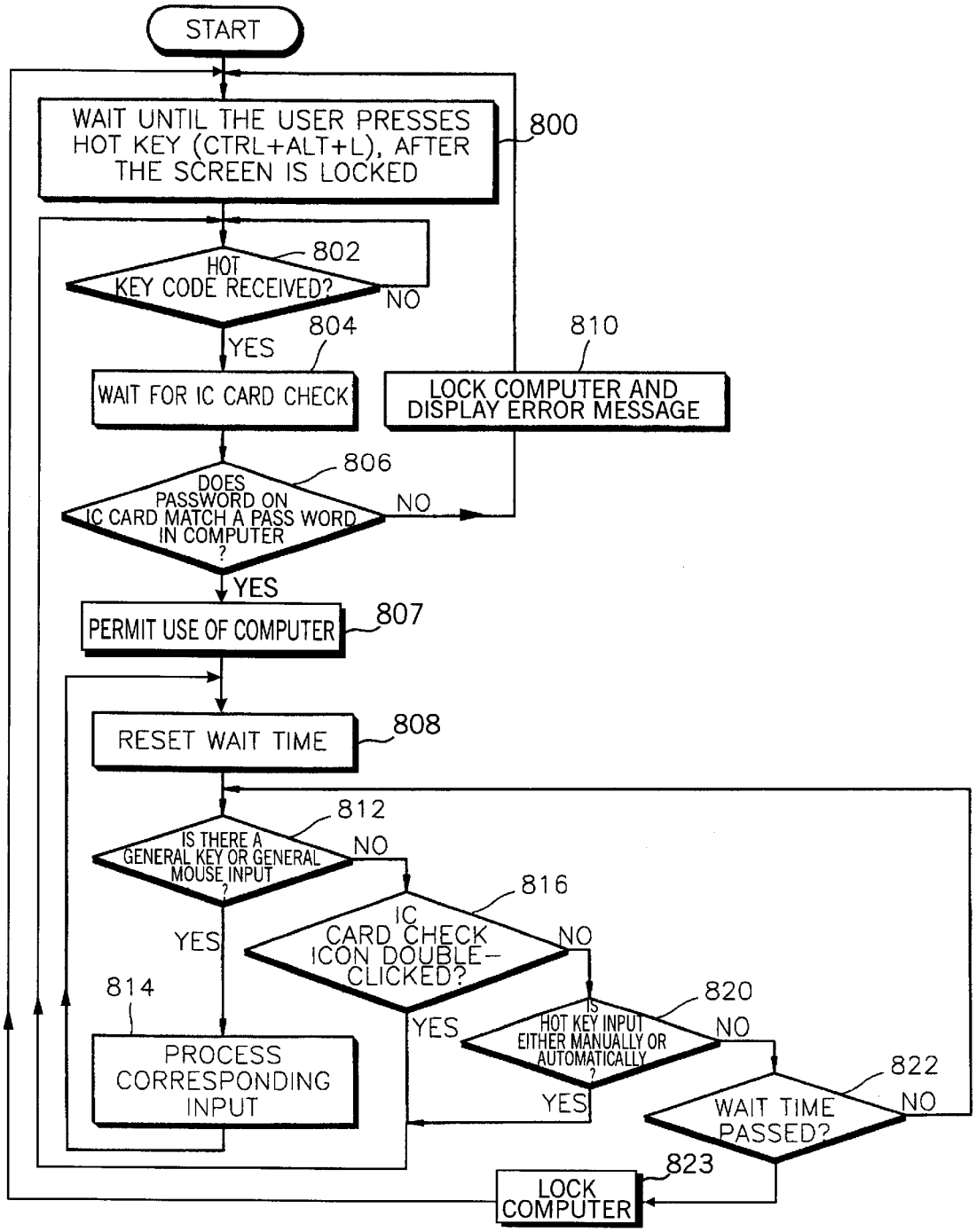
FIG. 8 is a flow chart for explaining the method shown in FIG. 7 in view of the operation of the computer.

FIG. 8 is a flow chart for explaining the computer security method of FIG. 7 in detail in view of the operation of the computer, where it is assumed that the screen is locked according to the check result of the IC card after the initial booting process.

First, after the screen is locked, the system waits for a predetermined combination key, a hot key, e.g., Ctrl+Alt+L, pressed by a user (step 800). Next, it is determined whether a hot key code corresponding to the pressed hot key is received (step 802). If the hot key code is not received, step 802 is repeated until the hot key code is received. That is, in order to release the locked screen, the IC card must be checked again. The combination key must be received for the computer 600 to go to a mode in which the computer waits for the check result of the IC card 640.

When the hot key code is received in step 802, the system waits for an input of the check result data with respect to the IC card 640 from the keyboard 620 (step 804). Then, when the check result data is transmitted, whether the check result data is proper is determined (step 806). When the check result data is determined to be proper in step 806, the computer 600 permits a right of use of the computer for the user (step 807). If the check result data is not proper, computer 600 locks itself and an error message informing the user that a use of computer is not permitted is displayed (step 810) and the system returns to step 800 for locking the screen.

If the check result data is determined to be proper in step 806, a use of computer is permitted for the user (step 807) and it is determined whether predetermined check conditions are satisfied for a continuous IC card check. To do so, the wait time that passes in a state in which there is no input from a user to the computer 600 is reset (step 808).

First, it is determined whether there is a general key or mouse input (step 812). When there is such an input, a predetermined action corresponding to the input is processed (step 814) and the system returns to step 808 where the wait time is reset. If the input is not a general key or mouse input, whether a hot key is input is determined. For example, when an IC card check icon corresponding to the combination key is displayed on a computer screen (which will be described with reference to FIG. 11A), it is determined whether the IC card check icon is double-clicked by the mouse (step 816). If the hot key is not input in such a manner, it is determined whether the hot key is input in a manner in which the user directly inputs the hot key using the keyboard 620 or the keyboard 620 automatically generates the hot key when the IC card is separated from keyboard 620 (step 820). If the hot key is determined to be input in step 816 or step 820, the system returns to step 802 to recheck the IC card 640.

If the hot key is determined not to be input after step 820, it is determined whether the wait time set in step 808 passes (step 822). If the wait time has passed, computer 600 automatically locks itself (step 823) and the system returns to step 802 to recheck IC card 640. Lastly, if the wait time does not expire, the system returns to step 812 to check the check conditions again.

Figure 9:
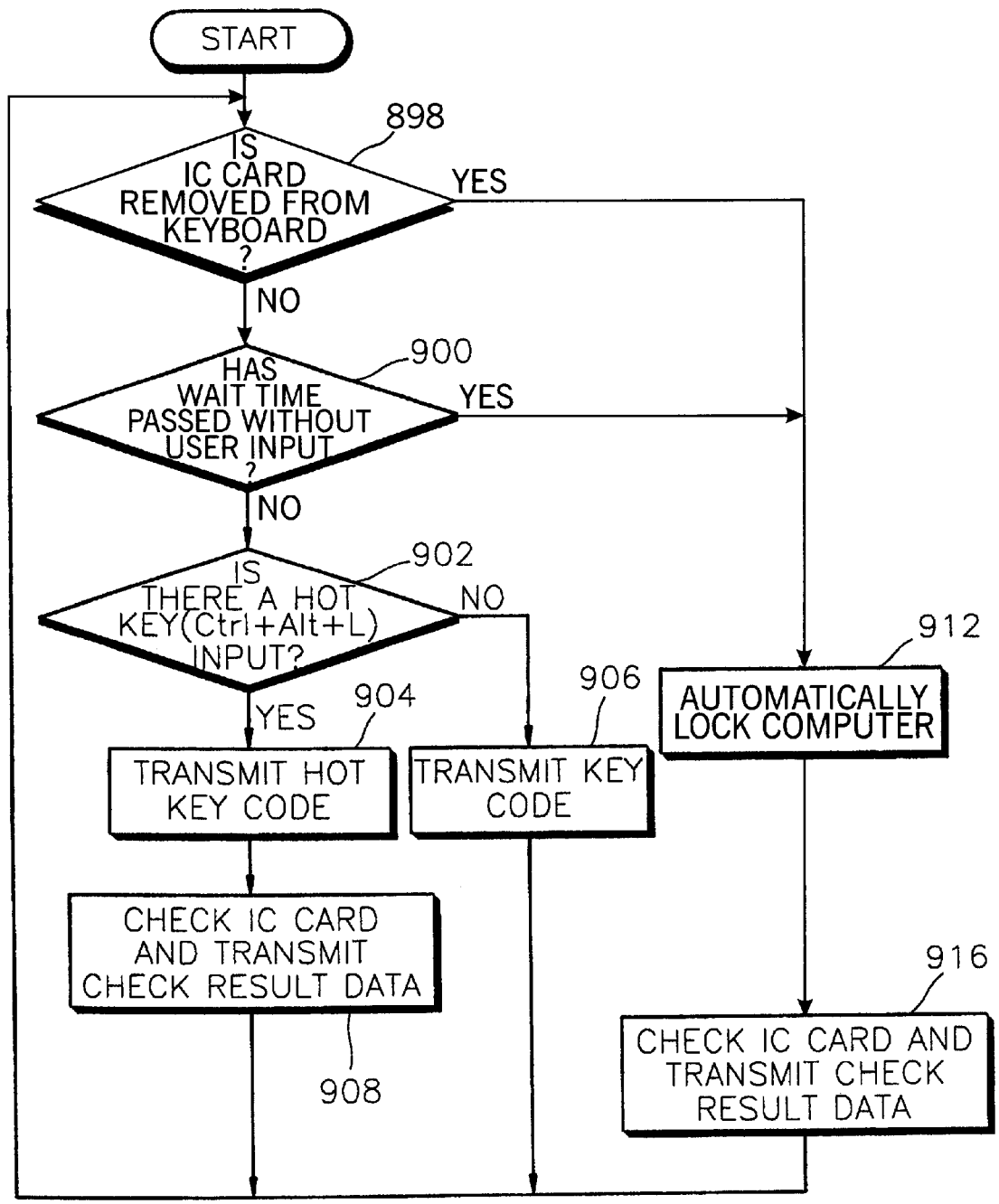
FIG. 9 is a flow chart for explaining the method shown in FIG. 7 in view of the operation of a keyboard.

FIG. 9 is a flow chart for explaining the method shown in FIG. 7 in detail in view of the operation of the keyboard.

First, it is determined whether IC card 640 is separated from keyboard 620 (step 898). If separated, the control passes to step 912 where computer 600 locks itself If IC card 640 is still attached to keyboard 620, the control passes to step 900 where it is determined whether a user has made an input via mouse or keyboard within the wait time preset by an authorized user. If there is no input within said wait time, the control passes to step 912 where computer 600 locks itself. If there is a key input, it is determined whether a hot key (Ctrl+Alt+L) is input by a user (step 902). If the user pressed a hot key, the hot key is transmitted to the computer (step 904). If the hot key is not input, a corresponding key code is transmitted (step 906). That is, a hot key code is transmitted like transmission of a general key code in step 904 to the computer such that the computer can prepare to receive the check result data with respect to the IC card. After step 904, the IC card is checked and the check result data is transmitted to the computer (step 908). If the check fails, the computer is locked. If the check passes, the control returns to step 898. After steps 906 and 908, the system returns to step 898 to repeat the above-mentioned actions.

If there is no mouse or key input within the wait time, or the IC card 640 is detached from keyboard 620, the control passes to step 912 where computer 600 is locked. When the computer is locked in step 912, the computer becomes ready to receive the check result data with respect to the IC card. After the computer is locked the password of the IC card is checked and the check result data is transmitted to the computer (step 916). If IC card 640 is detached from keyboard 620, no password is sent to computer 600 and the password test fails and computer 600 remains locked. Lastly, after step 916, if the check fails, the computer remains locked. If the check passes, computer 600 is unlocked and the control recycles to step 898 and repeats the above-mentioned actions.

Figure 10:
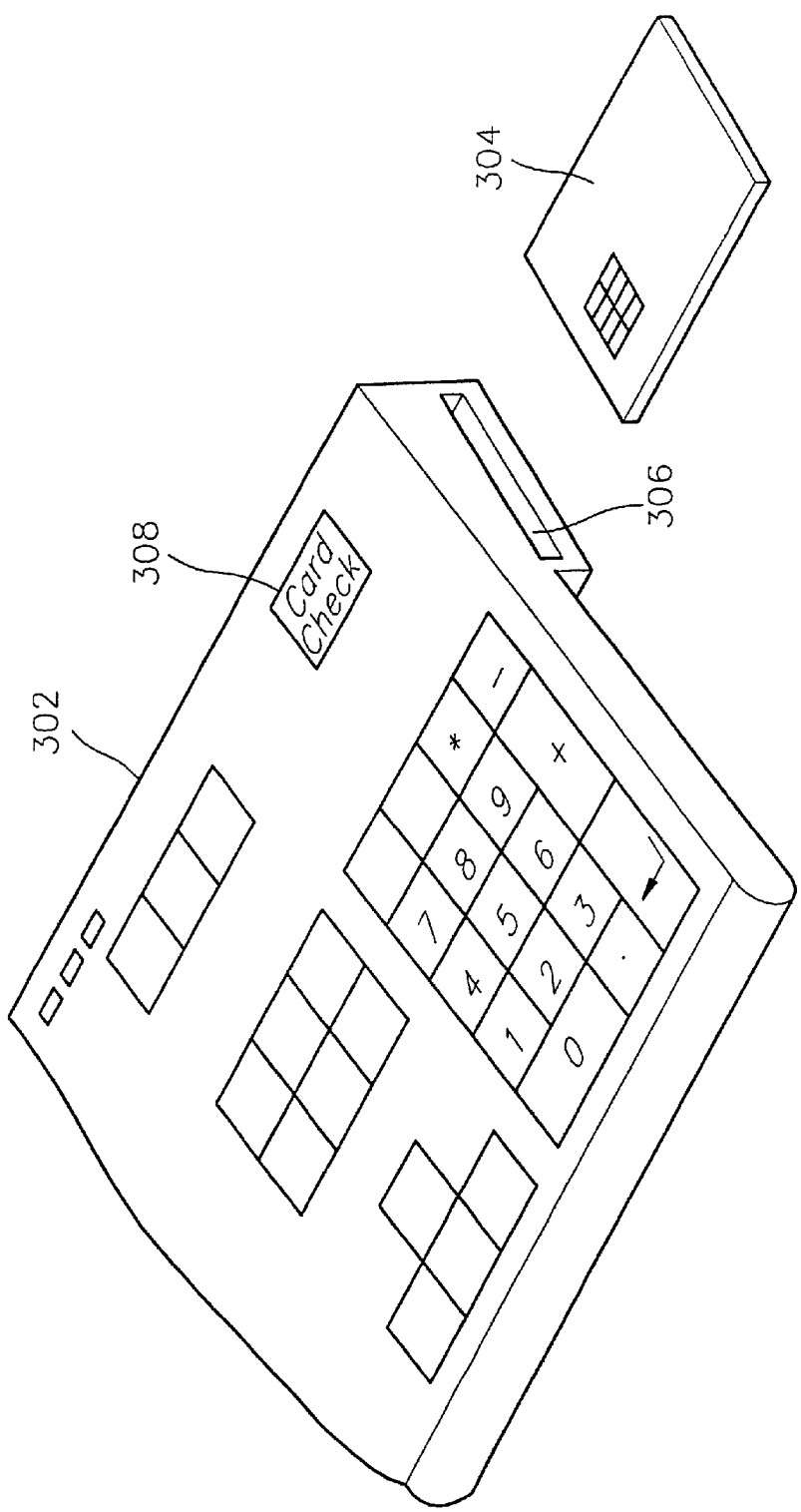
FIG. 10 is a view illustrating the appearance of a portion of a keyboard adopted by the system shown in FIG. 6.

FIG. 10 shows the appearance of portion of the keyboard and the IC card adopted by the system shown in FIG. 6. Here, reference numerals which are the same as those in FIG. 3 indicate the same elements of FIG. 3.

According to the foregoing, the system and method according to another preferred embodiment of the present invention uses a combination key or special key to check the IC card. As an example of the combination key, a hot key, e.g., Ctrl+Alt+L, is suggested. A card check button 308 is additionally provided as shown in FIG. 10, so that a user can select the hot key by pressing a single button.

Figure 11A:
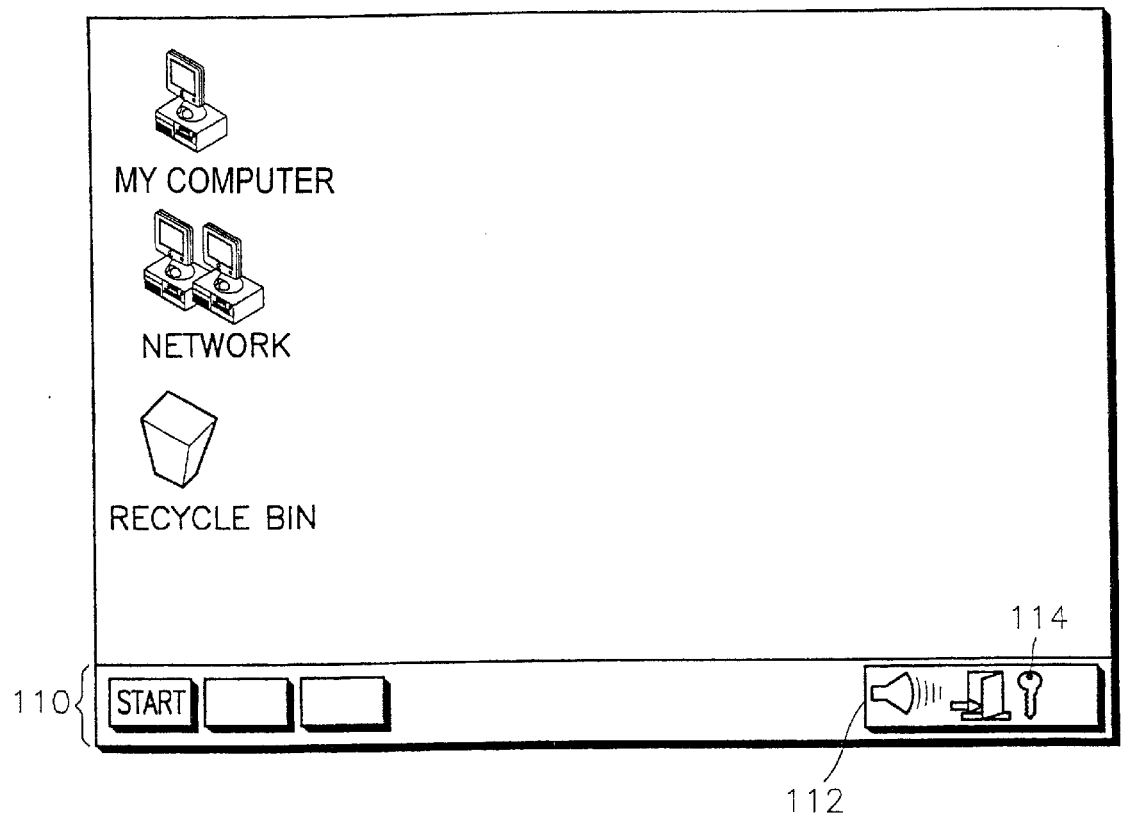
FIGS. 11A and 11B are views showing an icon corresponding to a combination key displayed on a screen of a computer and an IC card dialogue box after a screen is locked.
Figure 11B:
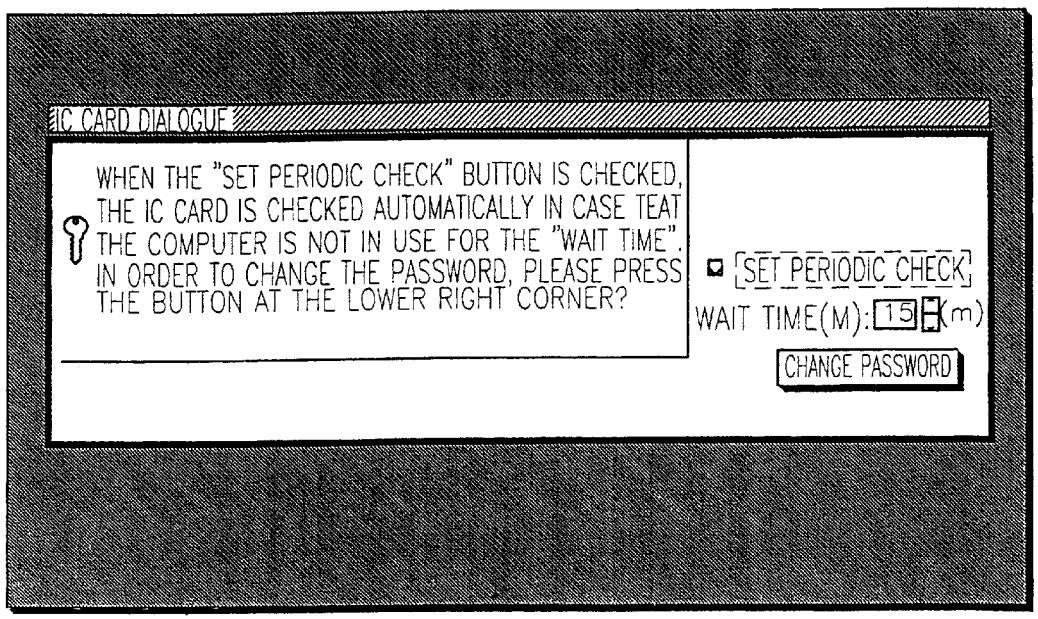

FIGS. 11A and 11B show examples of an icon corresponding to the combination key that can be displayed on the screen of the computer, and an IC card dialogue box after the screen is locked, respectively.

In FIG. 11A, an IC card check icon corresponding to the combination key is displayed on the computer screen, by which a user can select the combination key with a mouse. This can be embodied by an application program. Usually, shortcut icons included in the start program under the Windows circumstances are displayed in a tray area 112 in a task bar 110 at the bottom portion of the screen of FIG. 11A. An IC card check icon 114 in the tray area 112 corresponds to the combination key. When a user double-clicks the IC card check icon 114 using a mouse, the computer determines that the combination key is generated and performs a series of actions to check the IC card.

FIG. 11B shows an example of an IC card dialogue box. As shown in the drawing, the user can set a predetermined wait time using the dialogue box and change the password to the IC card.

As one of the method of changing an password of the IC card, the IC card is inserted through an insertion slot provided at one side of the keyboard and the computer is booted while a dedicated IC card diskette is inserted into the drive A. By executing a password change program from the drive A, a desired password can be re-recorded on the IC card according to a predetermined procedure. Next, the computer is booted from a hard disk and an application program for performing a computer security method according to the present invention is executed to display the IC card dialogue box on the screen. Then, the user selects a password change button shown in FIG. 11B and the password is changed.

Also, after the screen is locked, the IC card dialogue box shown in FIG. 11B can be used for a message for inputting a hot key, such as Ctrl+Alt+L, by the user. Here, the background screen is processed in black as the screen is locked as shown in FIG. 11B. When the screen is locked and a message indicating that "Please re-install a proper IC card or press Ctrl+Alt+L button" is displayed (not shown), the user checks whether the IC card is accurately plugged in and presses the hot key.

Figure 12:
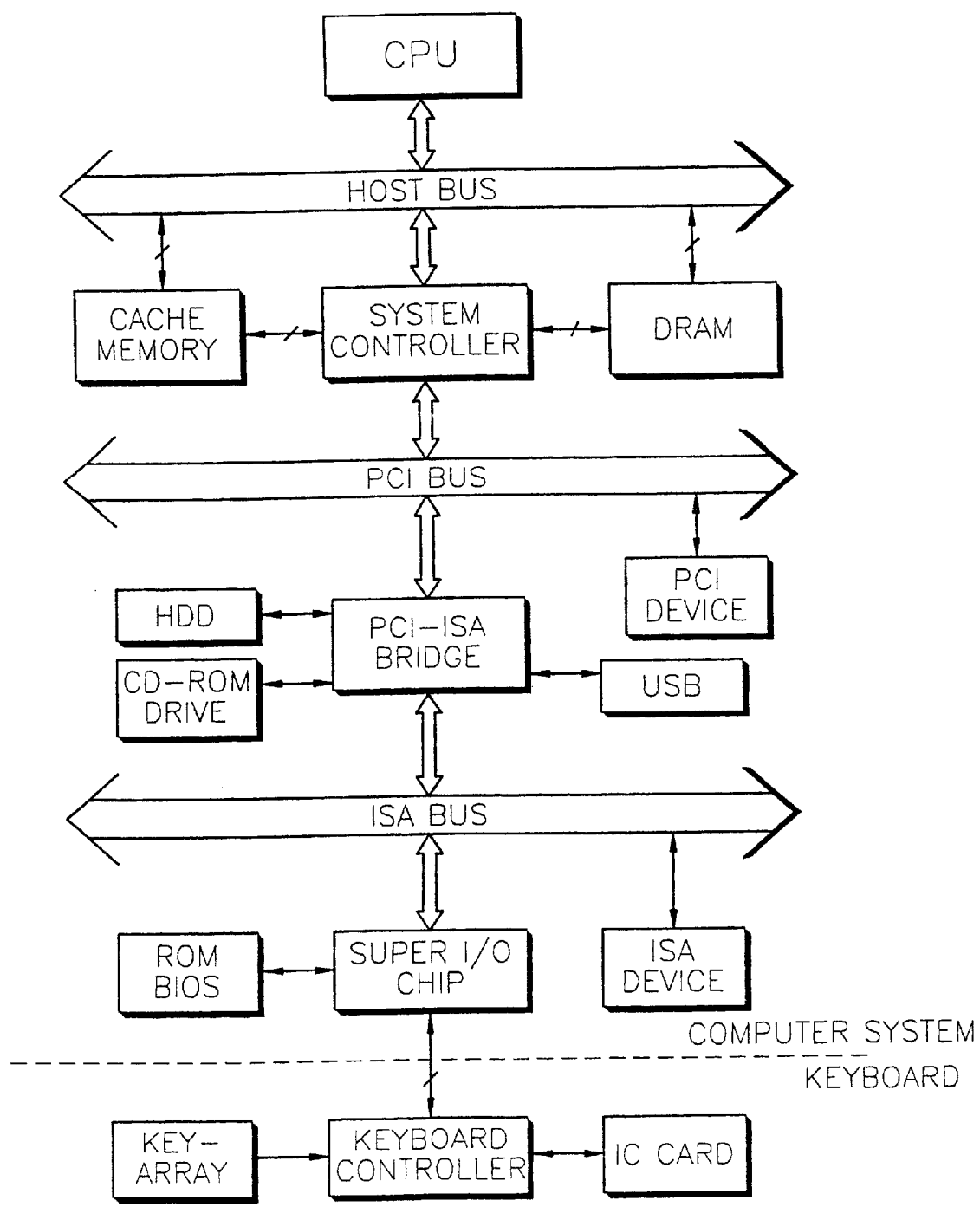
FIG. 12 is a block diagram showing the inside of a computer system to explain the computer security system according to the present invention.

FIG. 12 shows the configuration of the inside of the computer system for explaining the computer security system according to the present invention. To assist understanding of the present invention, connection relationship between the computer system and the keyboard is shown. Referring to the drawing, as the power of the computer is turned on for a booting process, a reset signal is generated and a super input/output (I/O) chip, a PCI-ISA bridge, a system controller, and a CPU are initialized in a predetermined order in reply to the reset signal. Next, one of tasks performed by a ROM-BIOS is an interrupt management, that is, to manage peripheries connected to the computer. The computer security program stored in the hard disk drive which will be actually embodied is stored on a DRAM while the booting process. The CPU monitors and executes the program. Also, the keyboard controller of the keyboard monitors the IC card and informs of the computer information on the IC card.

It is noted that the present invention is not limited to the preferred embodiment described above, and it is apparent that variations and modifications by those skilled in the art can be effected within the spirit and scope of the present invention defined in the appended claims.

As described above, according to the security card check computer security system and method according to the present invention, cost is reduced and an effect on computer security improves. Also, load on the computer due to the check command can be reduced.

What is claimed is:

1. A security card check type computer security method comprising the steps of:
    determining whenever a special key or a combination key is generated;
    waiting for IC card check whenever said special key or said combination key is generated;
    checking IC card and returning the checked result data;
    determining whenever said check result data is proper; and
    permitting use of the computer whenever said check result is proper.

2. The method of claim 1, wherein the computer is locked whenever said check result data is improper.

3. The method of claim 2, wherein the locking step of claim 2 is followed by the following steps:
    waiting until the user presses a hot key after the screen is locked;
    determining whenever said hot key is received;
    waiting for IC card check whenever said hot key code is received;
    determining whether the check result data is proper;
    resetting wait time whenever said check result data is proper;
    determining whenever there is key or mouse input; and
    processing corresponding input whenever key or mouse is input.

4. The method of claim 3, further comprising the steps of:
    determining whenever IC card check icon is double-clicked whenever there is no key or mouse input;
    determining whenever there is hot key input whenever card check icon is not double clicked;
    determining whenever wait time has passed whenever there is no hot key input; and
    locking the screen and displaying a message whenever said card check icon is double-clicked, or whenever said hot key is input, or whenever said wait time has passed.

5. The method of claim 2, wherein the method for the keyboard comprises the steps of:
    determining whenever there is key input;
    determining whenever there is hot key input whenever there is key input;
    transmitting hot key code whenever there is hot key input;
    checking IC card and transmitting check result data; and
    transmitting key code whenever there is no hot key input.

6. The method of claim 5, wherein the method for the keyboard comprises the steps of:
    determining whenever the IC card is plugged out whenever there is no key input;
    transmitting hot key code;
    determining whenever IC card is plugged in; and
    checking IC card and transmitting check result data whenever said IC card is plugged in.

7. A security card check type computer security method comprising the steps of:
    (a) determining whether a predetermined check condition for checking a right of a security card to use a computer, which stores at least security information enabling the identification of the right of use of computer, is satisfied and a combination key requiring checking is generated;
    (b) waiting for check result data with respect to said security card when said combination key is received;
    (c) checking the security information of said security card and obtaining the check result data; and
    (d) controlling the right of use of computer depending on the check result data.

8. The method as claimed in claim 7, wherein said step (a) comprises the steps of:
    (a1) setting a predetermined wait time passes in a state in which there is no input from a use to said computer after an initial booting process;
    (a2) determining whether a key or mouse input by the user, processing a predetermined action to a corresponding input whenever there is an input, and returning to said step (a1);
    (a3) whenever there is no input in said step (a2), determining whether the wait time passes, and whenever the wait time passes, denying a use of said computer and waiting until said combination key is generated by said user; and (a4) whenever the wait time does not pass in said step (a3), returning to said step (a2).

9. The method as claimed in claim 8, after step (a1), further comprising the steps of:
(a5) when an icon corresponding to said combination key is displayed on the screen of said computer, determining whether the user selects the icon; and
(a6) whenever said icon is selected, denying the use of said computer and returning to said step (b).

10. The method as claimed in claim 8, after said step (a1), further comprising the steps of:
(a7) determining whether said combination key is input by a key input from said user or said combination key is input automatically as said security card is plugged out; and
(a8) whenever said combination key is input, denying the use of said computer and returning to said step (b).

11. The method of claim 7, wherein said security information is a password, said check result data is generated by said computer by comparing a password on said IC card with a list of proper passwords stored in said computer.

12. The method of claim 1, wherein said check result is obtained by comparing a password on said IC card to a list of proper passwords stored in said computer.

13. A security card check type computer security method comprising the steps of:
(a) determining whether a predetermined check condition for checking a right of a security card, which stores at least security information enabling the identification of the right of use of computer, to use a computer is satisfied;
(b) generating a check command to check said security card when the predetermined check condition is satisfied;
(c) checking the security information of said security card according to the check command and obtaining check result data; and
(d) controlling the right of use of computer depending on the check result data.

14. The method as claimed in claim 13, wherein said step (a) comprises the steps of:
(a1) determining whether said computer is in an initial booting process;
(a2) determining whether a predetermined wait time passes in a state in which there is no input to said computer by a user after the initial booting process; and
(a3) determining whether said security card is plugged out after the initial booting process, wherein whenever at least any one among said steps a1–a3 is satisfied, the system goes to said step (b).

15. A method for providing security to a computer to only authorized users, comprising the steps of:
reading a password from an IC security card attached to said computer upon encountering certain conditions;
determining if a password read from said security card matches an approved password stored within said computer;
permitting use of said computer if said read password is authorized; and
locking said computer if said password is not authorized or when no security IC card is attached to said computer, said certain conditions being receipt of a hot key keystroke by said computer irrespective of whether said computer is locked or not.

16. The method of claim 15, said hot key stroke being generated by a user on an input device regardless of wether said computer is already locked.

17. The method of claim 16, said hot key stroke being generated by said user either by simultaneously depressing a combination of keys on a keyboard or by double clicking by a user on a security IC card icon located on a display.

18. A method for providing security to a computer to only authorized users, comprising the steps of:
reading a password from an IC security card attached to said computer upon encountering certain conditions;
determining if a password read from said security card matches an approved password stored within said computer;
permitting use of said computer if said read password is authorized; and
locking said computer if said password is not authorized or when no security IC card is attached to said computer, said certain conditions being booting up of said computer, having a first predetermined period of time pass without a user actuating an input device on said computer and detaching said IC card from said computer.

19. A method for providing limited security access to a computer already booted up, said method comprising the steps of:
generating a hot key stroke;
transmitting said hot key stroke to a computer;
consulting a security IC card attached to said computer to determine whether a password stored on said IC card is approved by said computer; and
permitting use of said computer or locking said computer based on whether a password read from said IC card is approved or not by said computer, said generating step can be accomplished automatically in response to certain computer condition or manually by a user.

20. The method of claim 19, said certain computer condition being detachment of said IC card from said computer.

21. The method of claim 19, said hotkey stroke being manually input by a user by either simultaneously pressing a key combination on a keyboard that is recognized as a hot key stroke by said computer and double clicking, via a mouse, on an IC card icon displayed on a display.

22. The method of claim 19, said locking of said computer being accomplished by forcing a screen saver to be displayed on a computer display or disabling mouse and keyboard input devices.

23. The method of claim 19, said computer being automatically locked upon an absence of user input to said computer for a first predetermined unit of time.

\* \* \* \* \*